(12) United States Patent
Millie

(10) Patent No.: US 10,306,827 B2
(45) Date of Patent: Jun. 4, 2019

(54) HYDRAULIC SYSTEM FOR AN AIR CART

(71) Applicant: CNH Industrial Canada, Ltd., Saskatoon (CA)

(72) Inventor: Stewart Joseph Millie, Saskatoon (CA)

(73) Assignee: CNH Industrial Canada, Ltd., Saskatoon, Saskatchewan (CA)

( * ) Notice: Subject to any disclaimer, the term of this patent is extended or adjusted under 35 U.S.C. 154(b) by 609 days.

(21) Appl. No.: 14/925,070

(22) Filed: Oct. 28, 2015

(65) Prior Publication Data
US 2016/0123353 A1 May 5, 2016

Related U.S. Application Data

(60) Provisional application No. 62/075,115, filed on Nov. 4, 2014.

(51) Int. Cl.
*A01C 19/00* (2006.01)
*A01C 15/00* (2006.01)

(52) U.S. Cl.
CPC ............ *A01C 19/00* (2013.01); *A01C 15/003* (2013.01); *F15B 2211/783* (2013.01)

(58) Field of Classification Search
CPC ....... A01C 19/00; A01C 15/003; A01C 15/00; F15B 2211/783; F15B 2211/78; F15B 2211/70; F15B 2211/00
See application file for complete search history.

(56) References Cited

U.S. PATENT DOCUMENTS

| | | | |
|---|---|---|---|
| 2,961,979 A * | 11/1960 | Stanley | A01C 11/00 111/102 |
| 3,844,357 A | 10/1974 | Ellinger | |
| 4,206,839 A | 6/1980 | Young | |
| 5,669,280 A | 9/1997 | Niiyama et al. | |
| 5,873,227 A | 2/1999 | Arner | |
| 6,068,063 A | 5/2000 | Mayerle et al. | |
| 6,354,081 B1 | 3/2002 | Burton | |
| 7,254,945 B1 * | 8/2007 | Sakai | F15B 7/006 60/476 |
| 7,316,110 B2 | 1/2008 | Schilling | |
| 7,467,505 B2 | 12/2008 | MacGregor | |
| 7,854,402 B1 | 12/2010 | Travis | |
| 7,975,475 B2 | 7/2011 | Ramun | |

(Continued)

FOREIGN PATENT DOCUMENTS

WO 9839547 A2 9/1998

OTHER PUBLICATIONS

Evaluation Report 658, Alberta Farm Machinery Research Centre, Nov. 1991, pp. 1-10, http://www.agric.gov.ab.ca/navigation/engineering/afmrc/index.html.

(Continued)

*Primary Examiner* — Christopher J. Novosad
(74) *Attorney, Agent, or Firm* — Rebecca L. Henkel; Rickard K. DeMille

(57) ABSTRACT

A hydraulic system for an air cart includes a primary hydraulic assembly and a secondary hydraulic assembly. The hydraulic system also includes a first valve configured to block a flow of a hydraulic fluid flowing in a first direction from the primary hydraulic assembly and a second valve configured to block a flow of the hydraulic fluid flowing in a second direction from the secondary hydraulic assembly.

15 Claims, 6 Drawing Sheets

(56) References Cited

U.S. PATENT DOCUMENTS

| | | |
|---|---|---|
| 8,733,257 B2 | 5/2014 | Beaujot et al. |
| 9,068,578 B2 | 6/2015 | Opdenbosch |
| 2003/0010196 A1 | 1/2003 | Smith et al. |
| 2008/0121101 A1 | 5/2008 | Park |
| 2008/0289326 A1* | 11/2008 | Ohashi ............. F04B 1/2064 60/464 |
| 2010/0205953 A1* | 8/2010 | Bettin ............. A01C 7/081 60/455 |
| 2010/0228452 A1 | 9/2010 | Hosoya et al. |
| 2012/0291427 A1 | 11/2012 | Azuma et al. |

OTHER PUBLICATIONS

S150 Skid-Steer Loader Operation & Maintenance Manual, Bobcat, accessed Oct. 24, 2014, 1-9, http://www.multilize.com/RUS/htdocs/doc/Test_DTP.pdf.

Electro Hydraulic Control Solutions, HydraForce Integrated Hydraulic and Electronic Control Solutions, accessed Oct. 24, 2014, pp. 1-8, http://www.hydraforce.com/Literature/Solution_Brochures/English/Excavator_Solution.pdf.

* cited by examiner

HYDRAULIC SYSTEM FOR AN AIR CART

CROSS REFERENCE TO RELATED APPLICATIONS

This application claims priority from and the benefit of U.S. Provisional Patent Application No. 62/075,115, entitled "HYDRAULIC SYSTEM FOR AN AIR CART," filed Nov. 4, 2014, which is hereby incorporated by reference in its entirety.

BACKGROUND

The present disclosure relates generally to agricultural equipment, and more specifically to a hydraulic system for an air cart.

A range of agricultural implements have been developed and are used for tilling, planting, harvesting, and so forth. Seeders, for example, are commonly towed behind tractors and cover swaths of ground. Seeding devices typically open the soil, dispense seeds in the soil opening, and re-close the soil in a single operation. In seeders, the seeds are commonly dispensed from bulk seed tanks and distributed to row units by a distribution system. In certain configurations, an air cart is towed with the seeder to deliver a desired flow of seeds to the row units.

Air carts generally include a storage tank, an air source (e.g., a blower or fan), a metering assembly, and a filling mechanism. Seeds, or other particulate material, are typically gravity fed from the storage tank to the metering assembly that dispenses a desired amount of seeds into an air stream generated by the air source. The air stream then carries the seeds to the row units via hoses and pipes (e.g., conduits) extending from the air cart to the seeder. The metering assembly typically includes meter rollers or other metering devices that regulate the flow of seeds based on meter roller geometry and rotation rate. When the quantity of seeds or other product in the storage tank depletes, the filling mechanism may be used to refill the storage tank. For example, the filling mechanism conveys product from a source, such as a truck, into the storage tank.

Air carts typically include various actuators (e.g., hydraulic motors, hydraulic cylinders) that drive various parts of the equipment, such as the air source and the filling mechanism, for example. With traditional air carts, an operator physically adjusts a manual selector valve located on the air cart to switch between supplying hydraulic fluid to drive the air source or to drive the filling mechanism, for example. In such cases, the operator approaches the air cart. Additionally, the manual selector valve is generally not configured to control the flow rate of the hydraulic fluid being supplied to the hydraulic motors. Further, a manual selector valve and the associated mounting equipment are relatively expensive.

BRIEF DESCRIPTION

In one embodiment, a hydraulic system for an air cart includes a primary hydraulic assembly and a secondary hydraulic assembly. The hydraulic system includes a first valve configured to block a flow of a hydraulic fluid flowing in a first direction from the primary hydraulic assembly and a second valve configured to block a flow of the hydraulic fluid flowing in a second direction from the secondary hydraulic assembly.

In one embodiment, a hydraulic system for an air cart includes a first primary hydraulic motor configured to power a fan of the air cart, and a first secondary hydraulic motor configured to power a conveyor, wherein the conveyor is configured to convey a product into a storage tank of the air cart. The hydraulic system includes a first valve configured to facilitate flow of a hydraulic fluid flowing in a first direction through the first primary hydraulic motor and to block the hydraulic fluid flowing in a second direction from flowing through the first primary hydraulic motor. A second valve is configured to facilitate flow of the hydraulic fluid flowing in the second direction through the first secondary hydraulic motor and to block the hydraulic fluid flowing in the first direction from flowing through the first secondary hydraulic motor.

In one embodiment, a hydraulic system for an air cart includes a first fluid conduit configured to couple to a primary hydraulic motor and a second fluid conduit configured to fluidly couple to a secondary hydraulic motor. The hydraulic system also includes a first hydraulic junction comprising a first member and a second member, and the first member of the first hydraulic junction is fluidly coupled to the first fluid conduit, and the second member of the first hydraulic junction is fluidly coupled to the second fluid conduit. Also, the hydraulic system includes a first check valve fluidly coupled to the second fluid conduit and to the second member of the first hydraulic junction. The first check valve is configured to block a flow of a hydraulic fluid flowing in a first direction through the second fluid conduit. The hydraulic system also includes a second hydraulic junction having a first member and a second member, the first member of the second hydraulic junction is fluidly coupled to the first fluid conduit, and the second member of the second hydraulic junction is fluidly coupled to the second fluid conduit. The hydraulic system further includes a second check valve fluidly coupled to the first fluid conduit and to the first member of the second hydraulic junction, and the second check valve is configured to block a flow of the hydraulic fluid flowing in a second direction through the first fluid conduit.

DRAWINGS

These and other features, aspects, and advantages of the present invention will become better understood when the following detailed description is read with reference to the accompanying drawings in which like characters represent like parts throughout the drawings, wherein.

DETAILED DESCRIPTION

Figure 1:
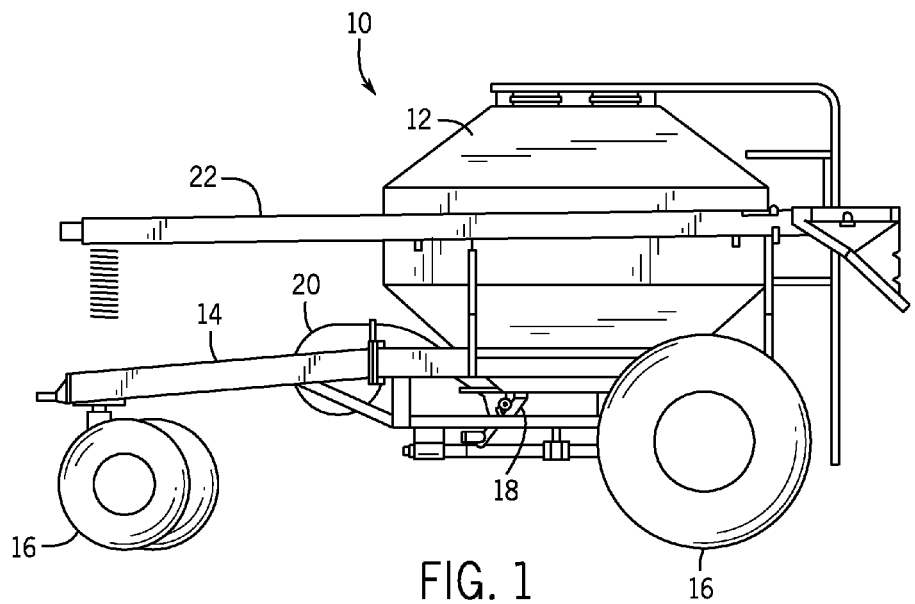
FIG. 1 is a side view of an embodiment of an air cart including a metering assembly configured to regulate a flow of particulate material and a filling mechanism configured to convey product from a transportation vessel into a storage tank of the air cart.

One or more specific embodiments of the present invention will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present invention, the articles "a," "an," "the," and "said" are intended to mean that there are one or more of the elements. The terms "comprising," "including," and "having" are intended to be inclusive and mean that there may be additional elements other than the listed elements.

Embodiments disclosed herein include a hydraulic system for an air cart. More particularly, disclosed embodiments include a hydraulic system that enables selection of, or switching between, different operations (e.g., functions) of the air cart by reversing a flow of hydraulic fluid to the air cart.

As noted above, air carts include various components, such as an air source and a metering assembly, to facilitate seeding operations (e.g., transfer seeds or other agricultural products from a storage tank of the air cart to the row units of an agricultural implement). Additionally, air carts include various components, such as a conveyance system (e.g., filling mechanism) having a conveyor (e.g., an auger, a belt, or the like) mounted on an adjustable arm, to facilitate filling operations (e.g., conveyance operations or transfer of seeds or other agricultural products from a transportation vessel [e.g., a truck] to the storage tank of the air cart). The components for seeding operations and the components for filling operations may be driven by respective hydraulic motors or positioned by hydraulic cylinders. The seeding operations and the filling operations are carried out at different times.

The disclosed embodiments provide a hydraulic system that provides a flow of hydraulic fluid to a first hydraulic motor that drives a component to facilitate seeding operations. Upon reversal of the flow of hydraulic fluid, the hydraulic system provides the hydraulic fluid to a second hydraulic motor that drives a component to facilitate filling operations. As discussed in more detail below, the disclosed embodiments include a direction control valve that is configured to enable efficient switching between seeding operations and filling operations. The disclosed embodiments may also enable control of a flow rate of the hydraulic fluid to the various components. Therefore, the disclosed embodiments may enable efficient selection of air cart operations, enable hydraulic fluid flow rate control, and/or reduce the cost of the air cart.

Turning now to the drawings, FIG. 1 is a side view of an air cart 10 that may be used in conjunction with a towable agricultural implement to deposit seeds into the soil. For example, certain agricultural implements include row units configured to open the soil, dispense seeds into the soil opening, and re-close the soil in a single operation. Such implements are generally coupled to a tow vehicle, such as a tractor, and pulled through a field. In certain configurations, seeds are conveyed to the row units by the illustrated air cart 10, which is generally towed in sequence with the implement. The air cart 10 may also be configured to provide fertilizer to the row units, or a combination of seeds and fertilizer.

In the illustrated embodiment, the air cart 10 includes a storage tank 12, a frame 14, wheels 16, a metering assembly 18, an air source 20, and a filling mechanism 22. In certain configurations, the storage tank 12 includes multiple compartments for storing various flowable particulate materials (e.g., agricultural products). For example, one compartment may include seeds and another compartment may include a dry fertilizer. Each compartment may have a separate metering assembly 18. In such configurations, the air cart 10 is configured to deliver both the seeds and the fertilizer to the implement. As shown, the frame 14 includes a towing hitch configured to couple to the implement or tow vehicle. Seeds and/or fertilizer within the storage tank 12 are gravity fed into the metering assembly 18. The metering assembly 18 includes a meter roller that regulates the flow of material from the storage tank 12 into an air stream provided by the air source 20. The air stream then carries the material to the implement via pneumatic pipes and hoses (e.g., conduits). In this manner, the row units receive a supply of seeds and/or fertilizer for deposition into the soil.

When the product or products in the storage tank 12 are exhausted or nearly exhausted, the filling mechanism 22 is used to refill the storage tank 12. As discussed in more detail below, the filling mechanism 22 includes an arm and a conveyor mounted to the arm. The arm is configured to move relative to the storage tank 12, and the movement of the arm may be controlled by an operator. For example, a portion of the conveyor may be moved to a position below a transportation truck, or other vessel, such that product flows directly from an outlet located on the bottom of the truck or vessel into the portion of the conveyor. The conveyor may then convey product into the storage tank 12. Additionally, if the storage tank comprises multiple compartments as discussed above, the arm may be moved to distribute the product into an appropriate compartment.

Figure 2:
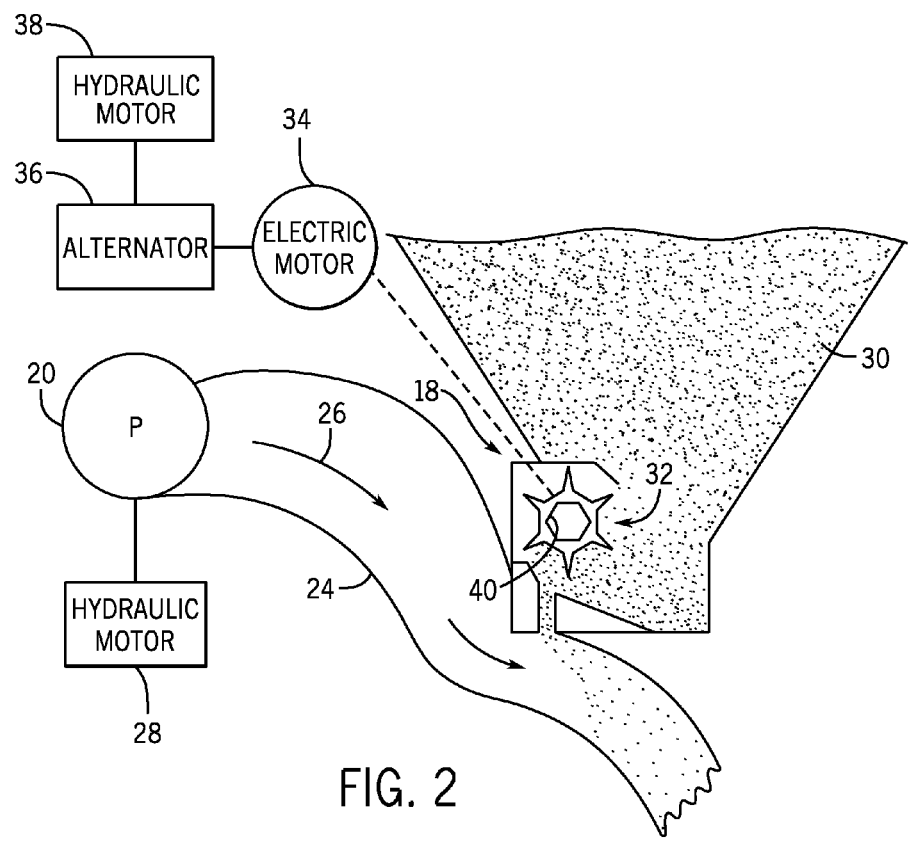
FIG. 2 is a schematic view of the metering assembly, as shown in FIG. 1, including an embodiment of a system for supplying power to the metering assembly.

FIG. 2 is a schematic view of the metering assembly 18, as shown in FIG. 1. As illustrated, the air source 20 is coupled to a conduit 24 that is configured to flow air 26 past the metering assembly 18. The air source 20 may be a pump or blower driven by an actuator, such as a hydraulic motor 28, for example. In one embodiment, the hydraulic motor 28 powering the air source 20 may be part of a primary hydraulic assembly of a hydraulic system, as discussed further herein. Flowable particulate material 30 (e.g., seeds, fertilizer, or the like) within the storage tank 12 flows by gravity into the metering assembly 18. The metering assembly 18 includes one or more meter rollers 32 configured to regulate the flow of material 30 into the air flow 26. More particularly, the metering assembly 18 may include multiple meter rollers 32 disposed adjacent to one another along a longitudinal axis of the storage tank 12. For example, certain metering assemblies 18 include seven meter rollers 32. However, alternative embodiments may include more or fewer meter rollers 32, e.g., 1, 2, 3, 4, 5, 6, 8, 9, 10, or more. In one embodiment, the one or more meter rollers 32 may be driven by an actuator, such as an electric motor 34, which may be powered by an alternator 36. The alternator 36 may be powered by another hydraulic motor 38, which may also be part of a primary hydraulic assembly of the disclosed hydraulic system, as discussed in more detail below. It should be appreciated that in some embodiments the meter rollers 32 may be driven directly by the hydraulic motor 38 without the use of the alternator 36 and the electric motor 34. Furthermore, in some embodiments, a single hydraulic motor may drive both the air source 20 and the meter rollers 32 (e.g., the single hydraulic motor may be coupled to both the air source 20 and the alternator 36).

As shown, each meter roller 32 includes an interior cavity 40 configured to receive a shaft that drives the meter roller 32. In the present embodiment, the cavity 40 has a hexagonal cross section. However, alternative embodiments may include various other cavity configurations (e.g., triangular, square, keyed, splined, etc.). The shaft is coupled to a drive unit, such as the electric motor 34, configured to rotate the meter rollers 32.

The hydraulic motors 28, 38 drive the air source 20 and the meter roller 32, respectively, which act together to convey the product from the storage tank 12 to the row units. Thus, the two hydraulic motors 28, 38 facilitate a seeding operation, which may be considered a primary function of the air cart 10. In one embodiment, the hydraulic motors 28, 38 may be arranged in series such that hydraulic fluid enters one hydraulic motor and subsequently enters the other hydraulic motor at the same flow rate. Alternatively, the hydraulic motors 28, 38 may be arranged in parallel or as part of separate hydraulic circuits. For example, in one embodiment, the hydraulic motors 28, 38 may be arranged in a parallel configuration, and a proportional flow valve is provided to adjust a rate of hydraulic fluid flow to each hydraulic motor 28, 38. Regardless of the configuration, hydraulic fluid enters the hydraulic motor 28, 38 at a desired flow rate and turns a shaft to create torque to drive a device, such as the blower 20 or the alternator 36.

Figure 3:
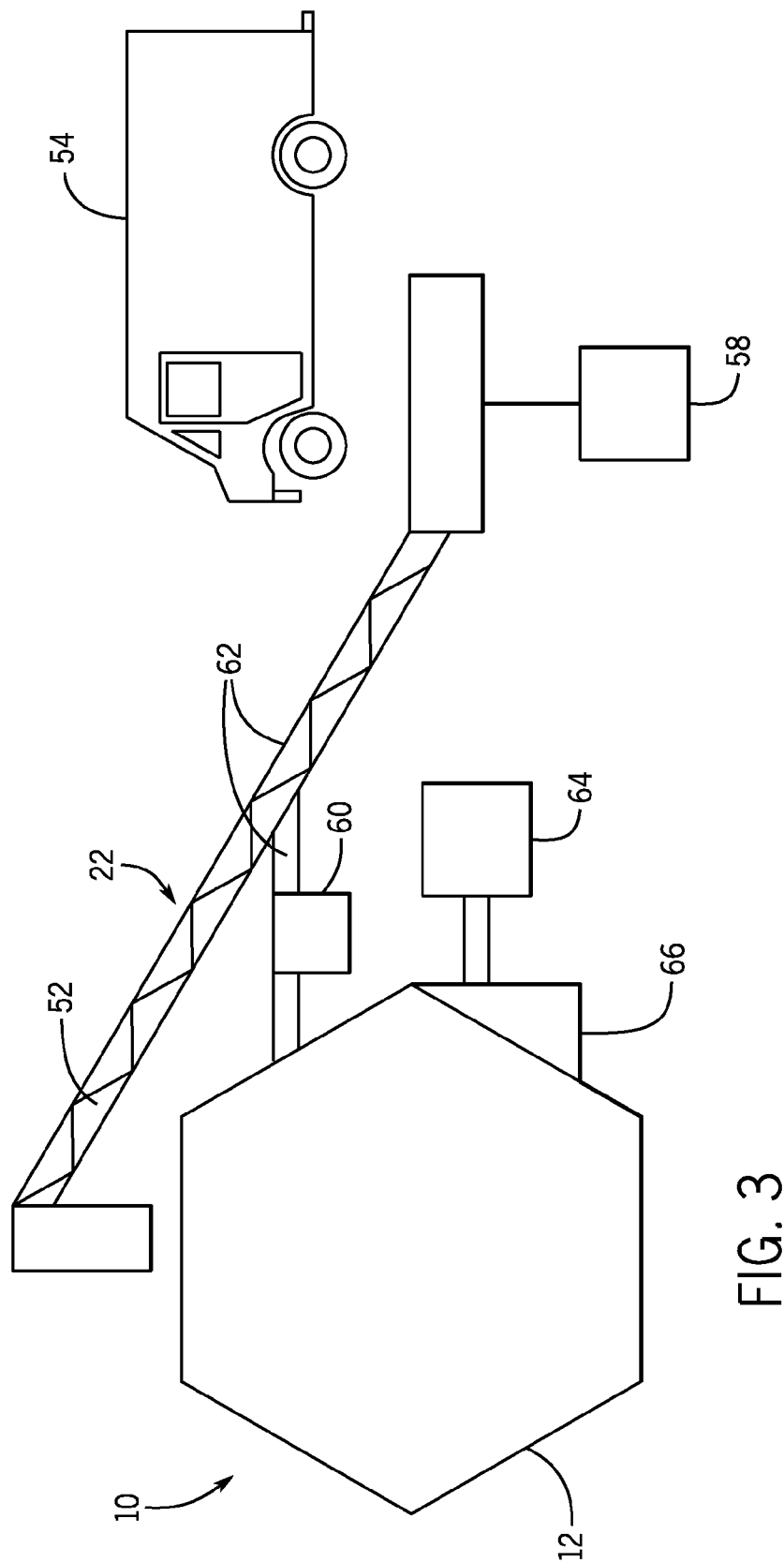
FIG. 3 is a schematic view of the filling mechanism, as shown in FIG. 1, including an embodiment of a system for supplying power to the filling mechanism.

FIG. 3 is a schematic diagram of the filling mechanism 22. The filling mechanism 22 is configured to convey material from a transportation vessel 54 (e.g., a truck) into the storage tank 12 of the air cart 10 to replenish the material for the seeding operation. Thus, the filling mechanism 22 facilitates a filling operation, which may be considered a secondary function of the air cart 10. It should be noted that the seeding operation (e.g., the primary function) and the filling operation (e.g., the secondary function) of the air cart 10 do not occur simultaneously. Rather, only the seeding operation or the filling operation is performed at any given time. Thus, a hydraulic system may provide a flow of hydraulic fluid to various actuators to drive various components to facilitate seeding operations, and upon reversal of the flow of hydraulic fluid may provide the hydraulic fluid to various actuators to drive various components to facilitate filling operations.

As shown, the filling mechanism 22 may utilize a conveyor 52 (e.g., an auger, a belt, or the like) to transport product from the transportation vessel 54 into the storage tank 12 of the air cart 10. The conveyor 52 may be powered by an actuator, such as a hydraulic motor 58, which may be part of a secondary hydraulic assembly of the disclosed hydraulic system. The hydraulic motor 58 provides the power and torque to drive the conveyor 52. The moving conveyor 52 then conveys the product from the transportation vessel 54 into the storage tank 12. In the illustrated embodiment, an actuator, such as hydraulic cylinders 60, controls an adjustable arm 62 of the filling mechanism 22. The hydraulic cylinders 60 may be part of a secondary hydraulic assembly of the disclosed hydraulic system. Hydraulic fluid is fed to the hydraulic cylinders 60 to reposition the arm 62, moving the conveyor 52 from one compartment of the storage tank 12 to another compartment of the storage tank 12. Additionally, the arm 62 may be raised and lowered with the hydraulic cylinders 60. As a non-limiting example, raising and lowering the arm 62 may enable an operator to place a portion of the conveyor 52 underneath the transportation vessel 54. While the portion of the conveyor 52 is underneath the transportation vessel 54, product may be released from the transportation vessel 54 to the conveyor 52 and transported to the storage tank 12 by the conveyor 52. In the illustrated embodiment, a second hydraulic motor 64 is provided to drive an auxiliary feed system 66. The auxiliary feed system 66 may be configured to provide additional product into the storage tank 12 of the air cart 10 (e.g., via a pneumatic distribution system). The hydraulic motor 64 may be part of a secondary hydraulic assembly of the disclosed hydraulic system.

In one embodiment, the hydraulic motors 58, 64 of FIG. 3 may be connected in series such that each hydraulic motor 58, 64 receives the same flow of hydraulic fluid. Alternatively, the motors 58, 64 and/or hydraulic cylinders 60 may be connected in parallel, or as parts of separate hydraulic systems. For example, in one embodiment, the hydraulic motors 58, 64 may be arranged in a parallel configuration, and a proportional flow valve is provided to adjust a rate of hydraulic fluid flow to each hydraulic motor 58, 64. Regardless of the configuration, hydraulic fluid enters the hydraulic motors 58, 64 at a desired flow rate and turns a shaft to create torque that drives a device, such as the conveyor 52 or the auxiliary feed system 66.

Figure 4:
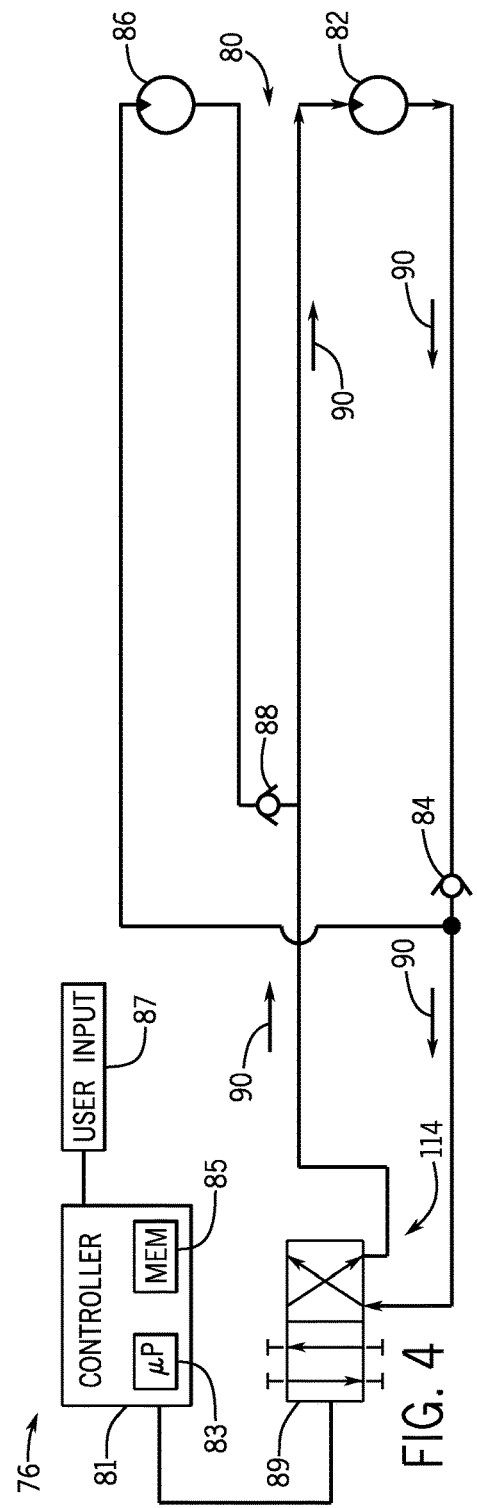
FIG. 4 is a schematic diagram of an embodiment of a hydraulic system having a primary hydraulic assembly and a secondary hydraulic assembly, in which hydraulic fluid is flowing in a first direction.
Figure 5:
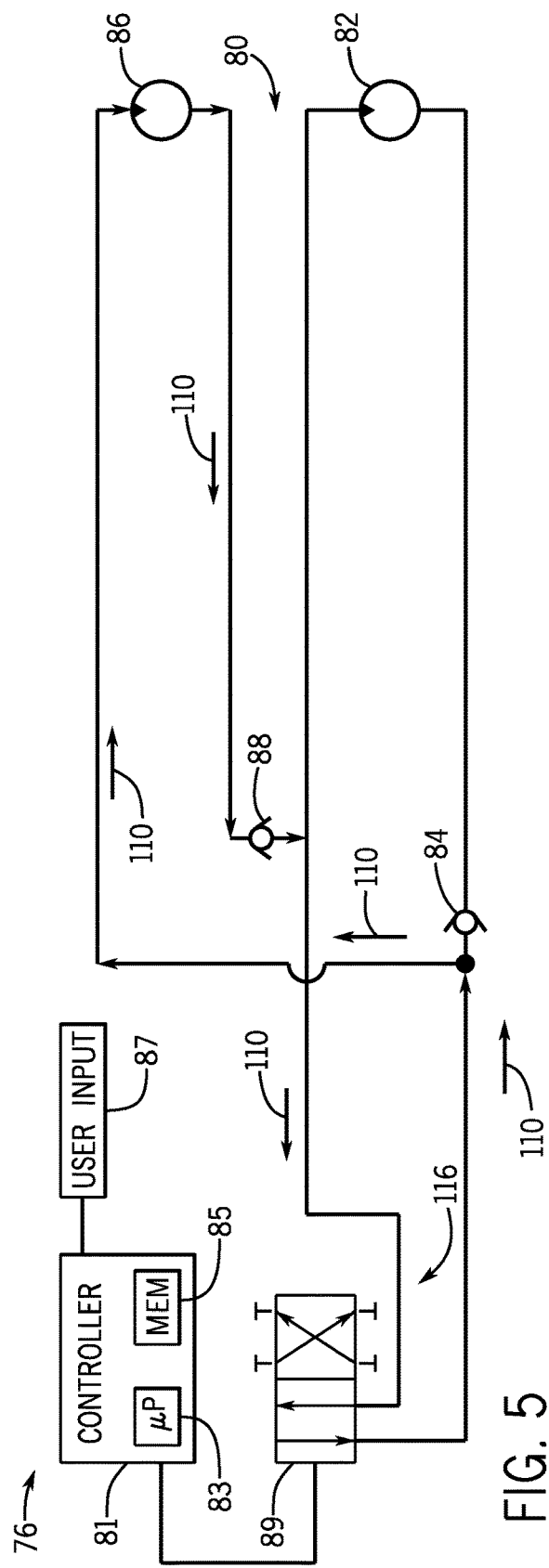
FIG. 5 is a schematic diagram of the hydraulic system of FIG. 4, in which hydraulic fluid is flowing in a second direction.

FIGS. 4 and 5 show one embodiment of a portion of a hydraulic system 76. FIGS. 4 and 5 illustrate a hydraulic circuit 80 having various hydraulic motors, hydraulic junctions, and valve assemblies. In certain embodiments, only one hydraulic circuit may be provided within the air cart 10, while in other embodiments, two or more hydraulic circuits may be provided on the air cart 10. Specifically, the hydraulic circuit 80 includes a primary hydraulic assembly 82, a first valve assembly 84, a secondary hydraulic assembly 86, and a second valve assembly 88. In certain embodiments, the primary hydraulic assembly 82 and/or the secondary hydraulic assembly 84 may include more than one hydraulic motor. With reference to FIG. 4, the hydraulic circuit 80 is configured such that when hydraulic fluid flows in a direction 90, the hydraulic fluid is blocked from entering the secondary hydraulic assembly 86 by the second valve assembly 88. However, hydraulic fluid flows through the primary hydraulic assembly 82 because the first valve assembly 84 is configured to enable the flow of hydraulic fluid in the direction 90. Conversely, as shown in FIG. 5, when the flow of hydraulic fluid is reversed and flows in a direction 110, the hydraulic fluid is blocked from entering the primary hydraulic assembly 82 by the first valve assembly 84, but enters the secondary hydraulic assembly 86 via the second valve assembly 88.

In one embodiment, the primary and secondary hydraulic assemblies 82, 86 may comprise one or more hydraulic motors, hydraulic control systems, and/or hydraulic tools. For example, as noted above, the primary hydraulic assembly 82 may include the hydraulic motor 28 configured to drive the air source 20 and/or may include the hydraulic motor 38 configured to power the alternator 36. Further, the secondary hydraulic assembly 86 may include the hydraulic motor 58 configured to drive the conveyor 52, the hydraulic cylinders 60 configured to drive the arm 62, and/or the hydraulic motor 64 configured to drive the auxiliary feed system 66. Additionally, in one embodiment the first and second valve assemblies 84, 88 may comprise one or more check valves and/or any one-way valve configured to restrict or block the flow of hydraulic fluid in a particular direction. As shown, the hydraulic system 76 includes a controller 81 having a processor 83 and a memory 85. The controller 81 may be disposed within a tractor towing the air cart 10. In certain embodiments, an operator may provide an input via user input 87 instructing the controller 81 to switch (e.g., revert) the flow of hydraulic fluid via a direction control valve 89.

In certain embodiments, the controller 81 is an electronic controller having electrical circuitry configured to process signals (e.g., signals indicative of a desired flow direction and/or flow rate) from the user input 87 and/or from other components of the hydraulic system 76. In the illustrated embodiment, the controller 81 includes a processor, such as the illustrated microprocessor 83, and a memory device 85. The controller 81 may also include one or more storage devices and/or other suitable components. The processor 83 may include multiple microprocessors, one or more "general-purpose" microprocessors, one or more special-purpose microprocessors, and/or one or more application specific integrated circuits (ASICS), or some combination thereof. For example, the processor 83 may include one or more reduced instruction set (RISC) processors.

The memory device 85 may include a volatile memory, such as random access memory (RAM), and/or a nonvolatile memory, such as ROM. The memory device 85 may store a variety of information and may be used for various purposes. For example, the memory device 85 may store processor-executable instructions (e.g., firmware or software) for the processor 83 to execute, such as instructions for controlling the hydraulic system 76 and components therein. The storage device(s) (e.g., nonvolatile storage) may include read-only memory (ROM), flash memory, a hard drive, or any other suitable optical, magnetic, or solid-state storage medium, or a combination thereof. The storage device(s) may store data (e.g., a desired flow rate, or the like), instructions (e.g., software or firmware for controlling the hydraulic system 76, or the like), and any other suitable data.

In certain embodiments, additional valves and controls may be included in the hydraulic circuit. As a non-limiting example, flow controls, pressure controls, and/or additional direction control valves may be included in the hydraulic circuit 80 to control additional functions of the air cart 10 and/or to provide more precise control over the seeding operation and/or filling operations.

In one embodiment, the operator of the air cart 10 may control a flow rate of the hydraulic fluid in the direction 90 and/or in the direction 110 with the controller 81. The flow rate of the hydraulic fluid in the direction 90 and/or the direction 110 can be input by the operator to enhance performance of the hydraulic assembly being powered. As a non-limiting example, if the primary hydraulic assembly 82 on the air cart 10 includes the hydraulic motor 28 configured to drive the fan 20, the operator may specify a flow rate less than the maximum flow rate of hydraulic fluid (e.g., 10, 20, 30, 40, 50, 60, 70, 80, or 90 percent of the maximum flow rate) to reduce air flow through the conduit 24. Too much air flow may lead to excessive product delivery to the metering assembly 18, and thus potential product waste. As a non-limiting example, the operator may set a first directional flow rate (e.g., a flow rate in the direction 90) at 60 percent of the maximum hydraulic fluid flow rate for the hydraulic motor 28 powering the fan 20, and a second directional flow rate (e.g., a flow rate in the direction 110) at 100 percent of the maximum hydraulic fluid flow rate for the hydraulic motor 58 powering the conveyor 52 of the filling mechanism 22. In the disclosed embodiments, the operator may input (e.g., via the user input 87) a desired flow rate for each flow direction 90, 110, prior to commencing seeding and/or filling operations. The desired flow rates may be stored in the memory 85, or any other suitable storage device. The controller 81 may be configured to control the directional control valve 89 to flow the hydraulic fluid at the desired flow rate. Thus, the flow rate may be automatically adjusted to the desired flow rate upon a change in the hydraulic fluid flow direction.

Figure 6:
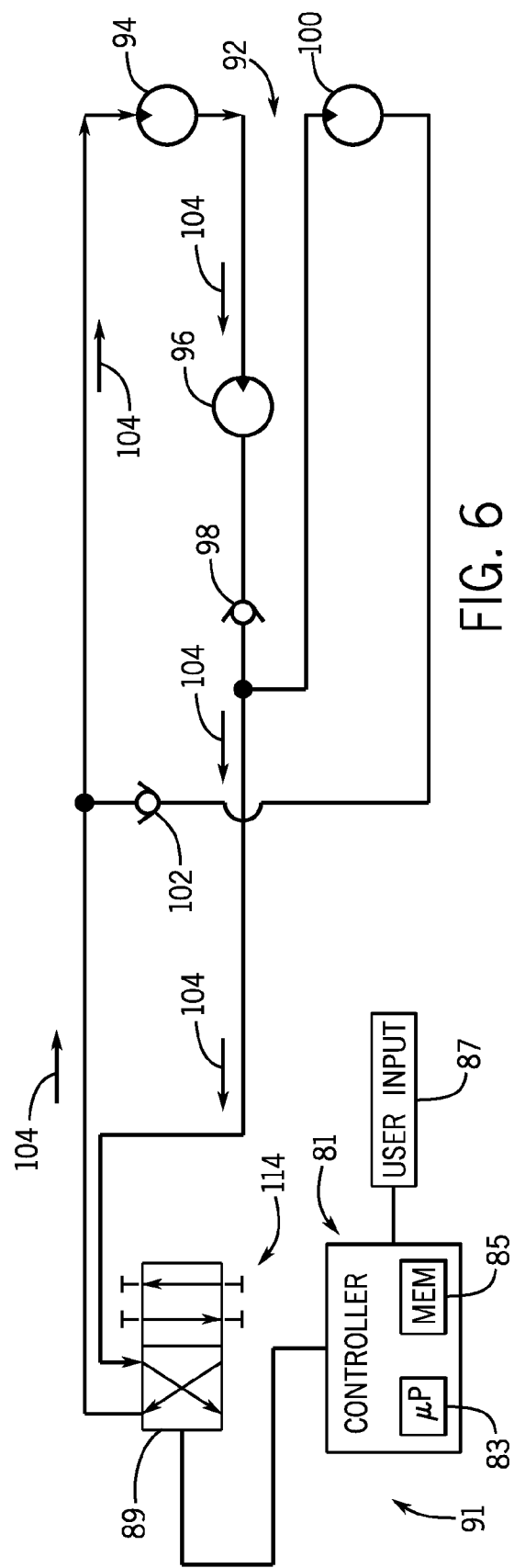
FIG. 6 is a schematic diagram of another embodiment of a hydraulic system having two primary hydraulic assemblies in series and a secondary hydraulic assembly, in which hydraulic fluid is flowing in a first direction.
Figure 7:
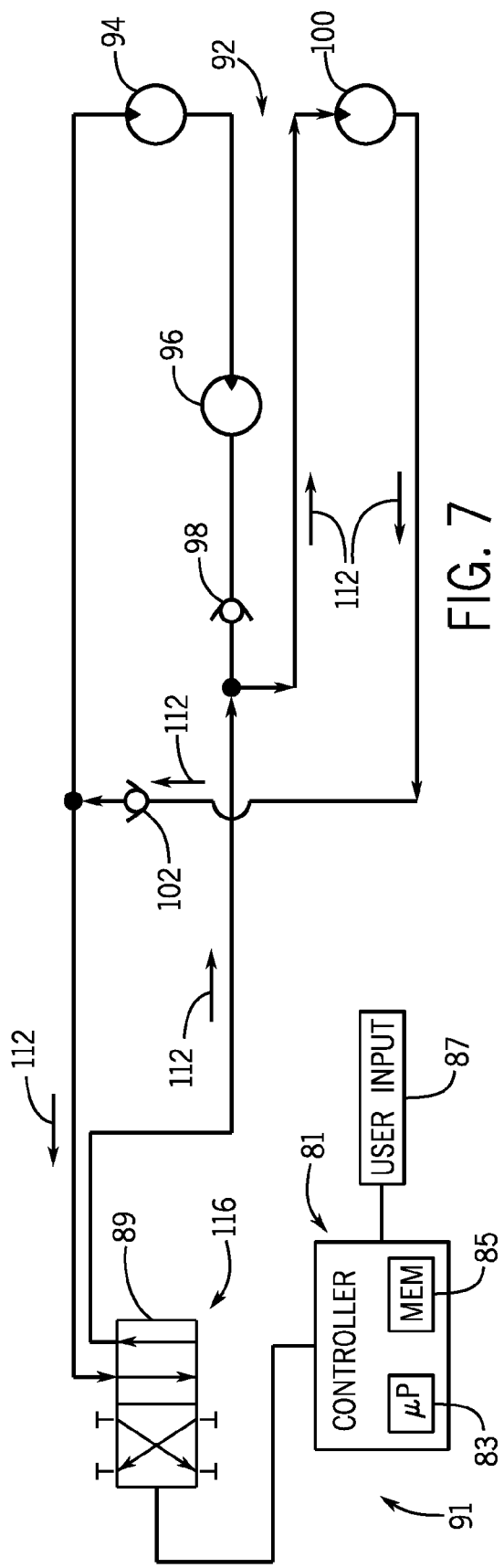
FIG. 7 is a diagram of the hydraulic system of FIG. 6, in which hydraulic fluid is flowing in a second direction.

FIGS. 6 and 7 show an embodiment of a portion of a hydraulic system 91 having a hydraulic circuit 92. The hydraulic circuit 92 includes a first primary hydraulic motor 94, a second primary hydraulic motor 96, a first valve assembly 98, a secondary hydraulic assembly 100, and a second valve assembly 102. The hydraulic circuit 92 functions in a similar manner to the hydraulic circuit 80, but includes additional components. For example, as shown, the hydraulic circuit 92 contains the first primary hydraulic motor 94 in series with the second primary hydraulic motor 96. In another embodiment, the first primary hydraulic motor 94 and the second primary hydraulic motor 96 may be arranged in a parallel configuration utilizing a junction or a direction control valve to distribute flow between the two motors 94, 96. The second valve assembly 102 is configured to block the flow of hydraulic fluid from entering the secondary hydraulic assembly 100 when the flow of hydraulic fluid is in a direction 104. The first valve assembly 98 is configured to enable the flow of hydraulic fluid through the first primary hydraulic motor 94 and the second primary hydraulic motor 96 in the direction 104. Conversely, as shown in FIG. 7, when the direction of hydraulic fluid is reversed (e.g., in direction 112), the first valve assembly 98 blocks the flow of hydraulic fluid to the first and second primary hydraulic motors 94, 96, and the second valve assembly 102 is configured to enable the flow of hydraulic fluid through the secondary hydraulic assembly 100.

In one embodiment the secondary hydraulic assembly 100 may include one or more hydraulic motors, hydraulic control systems, and/or hydraulic tools. It should be understood that various primary and secondary hydraulic assemblies may include any of the actuators disclosed herein. Additionally, in one embodiment the first and second valve assemblies 98, 102 may comprise one or more check valves and/or any other one-way valve configured to restrict or block the flow of hydraulic fluid in a specified direction.

As shown in FIGS. 4-7, reversing the flow of hydraulic fluid from the direction 90, 104 to the direction 110, 112 enables selection between a primary function (e.g., seeding operations) and a secondary function (e.g., filling operations) of the air cart 10. As a non-limiting example, an operator may switch between the seeding operation and the filling operation by providing an input to reverse the flow of hydraulic fluid.

In one embodiment, the operator may select the direction of the flow of hydraulic fluid by providing an input to adjust the directional control valve 89. The directional control valve 89 may include a first valve position 114 that is configured to direct hydraulic fluid flow in a first direction 90, 104 and a second valve position 116 that is configured to direct hydraulic fluid flow in a second direction 110, 112. The directional control valve 89 may be a spool valve or any other valve configured to switch between two directions of fluid flow. In certain embodiments, the directional control valve 89 may be adjusted from a cab of a tractor towing the air cart 10. Therefore, the presently disclosed system enables the operator to switch between the seeding operation and the filling operation without having to exit the cab of the tractor. Additionally, using a system with check valves may reduce the cost of the air cart 10 when compared to traditional air carts that use a manual selector valve mounted to the air cart. Generally, check valves are significantly less expensive than manual selector valves with associated fittings and mounting equipment.

As noted above, the operator of the air cart 10 may be able to control the flow rate of the hydraulic fluid in the directions 104, 112 with the controller 81. The desired flow rate of the hydraulic fluid may be input via the user input 87 by the operator to enhance performance of the hydraulic assembly being powered. The desired flow rate may be stored in the memory 85, and the controller 81 may control the flow rate according to the stored, desired flow rate. As a non-limiting example, if the secondary hydraulic assembly 100 includes the hydraulic motor 58 configured to drive the conveyor 52 of the filling mechanism 22 on the air cart 10, the operator may wish to utilize the maximum flow rate of hydraulic fluid to feed as much product to the storage tank 12 of the air cart 10 in the least amount of time. The less time it takes to refill the storage tank 12, the more time the operator has to perform seeding operations. The ability to store different hydraulic fluid flow rates for the seeding operation and the filling operation may lead to more efficient farming because the operator may easily set a higher flow rate for the filling operation and the hydraulic system 76, 91 may flow the hydraulic fluid through the hydraulic circuit 80, 92 in the set direction and at the desired flow rate. The disclosed features of the air cart 10 enable an operator to utilize two different functions of the air cart 10 at different power outputs without having to manually adjust a valve on the air cart 10 and/or reset the hydraulic flow rate each time a switch between the two functions occurs.

While only certain features of the invention have been illustrated and described herein, many modifications and changes will occur to those skilled in the art. It is, therefore, to be understood that the appended claims are intended to cover all such modifications and changes as fall within the true spirit of the invention.

What is claimed is:

1. A hydraulic system for an air cart comprising:
   a primary hydraulic assembly comprising a first hydraulic actuator;
   a secondary hydraulic assembly comprising a second hydraulic actuator;
   a direction control valve fluidly coupled to the primary hydraulic assembly and the secondary hydraulic assembly, wherein the direction control valve comprises a first position and a second position;
   a first hydraulic fluid loop configured to circulate a hydraulic fluid in a first direction from the direction control valve to the first hydraulic actuator when the direction control valve is in the first position;
   a second hydraulic fluid loop configured to circulate the hydraulic fluid in a second direction, opposite the first direction, from the direction control valve to the secondary hydraulic actuator when the direction control valve is in the second position;
   a first valve disposed along the first hydraulic fluid loop and configured to block a flow of the hydraulic fluid through the first hydraulic fluid loop when the direction control valve is in the second position; and
   a second valve disposed along the second hydraulic fluid loop and configured to block a flow of the hydraulic fluid through the second hydraulic fluid loop when the direction control valve is in the first position.

2. The hydraulic system of claim 1, wherein the first hydraulic actuator comprises a hydraulic motor configured to power a fan of the air cart.

3. The hydraulic system of claim 1, wherein the first hydraulic actuator comprises a hydraulic motor configured to power an alternator of the air cart.

4. The hydraulic system of claim 3, wherein the alternator is configured to power a metering system of the air cart.

5. The hydraulic system of claim 1, wherein the second hydraulic actuator comprises a hydraulic motor configured to power a conveyor of a conveyance system of the air cart.

6. The hydraulic system of claim 1, wherein the second hydraulic actuator comprises a hydraulic cylinder configured to control an arm of a conveyance system of the air cart.

7. The hydraulic system of claim 1, wherein second hydraulic actuator comprises a hydraulic motor configured to power an auxiliary feed system.

8. The hydraulic system of claim 1, wherein the first valve and the second valve comprise a check valve.

9. The hydraulic system of claim 1, wherein the hydraulic system is configured to accommodate different flow rates of the hydraulic fluid.

10. The hydraulic system of claim 9, wherein the first hydraulic fluid loop is configured to flow the hydraulic fluid at a first directional flow rate and the second hydraulic fluid loop is configured to flow the hydraulic fluid at a second directional flow rate, different from the first directional flow rate.

11. A hydraulic system for an air cart comprising:
    a first primary hydraulic motor configured to power a fan of the air cart;
    a first secondary hydraulic motor configured to power a conveyor, wherein the conveyor is configured to convey a product into a storage tank of the air cart;
    a direction control valve comprising a first position and a second position, wherein the direction control valve is configured to enable a hydraulic fluid to flow in a first direction from the direction control valve when the direction control valve is in the first position and to enable the hydraulic fluid to flow in a second direction from the direction control valve, opposite the first direction, when the direction control valve is in the second position;
    a first hydraulic fluid loop configured to circulate the hydraulic fluid in the first direction from the direction control valve to the first primary hydraulic motor when the direction control valve is in the first position;
    a second hydraulic fluid loop configured to circulate the hydraulic fluid in the second direction from the direction control valve to the first secondary hydraulic motor when the direction control valve is in the second position;
    a first valve disposed along the first hydraulic fluid loop and configured to facilitate flow of the hydraulic fluid in the first direction from the direction control valve to the first primary hydraulic motor and to block the flow of the hydraulic fluid in the second direction from the direction control valve to the first primary hydraulic motor; and
    a second valve disposed along the second hydraulic fluid loop and configured to facilitate flow of the hydraulic fluid in the second direction from the direction control valve to the first secondary hydraulic motor and to block the flow of the hydraulic fluid in the first direction from the direction control valve to the first secondary hydraulic motor.

12. The hydraulic system of claim 11, comprising a second primary hydraulic motor configured to power an alternator, wherein the alternator is configured to power a metering system of the air cart.

13. The hydraulic system of claim 11, comprising a second secondary hydraulic motor configured to power an auxiliary fill system.

14. The hydraulic system of claim 11, wherein the hydraulic system is configured to accommodate different flow rates of the hydraulic fluid.

15. The hydraulic system of claim 11, wherein the first valve and the second valve comprise a check valve.

* * * * *